United States Patent [19]

Howard, Jr. et al.

[11] Patent Number: 5,278,135

[45] Date of Patent: Jan. 11, 1994

[54] CERAMIC/DISTILLABLE BINDER COMPOSITIONS

[75] Inventors: Edward G. Howard, Jr., Hockessin; Raymond F. Tietz, Wilmington, both of Del.

[73] Assignee: E. I. Du Pont de Nemours and Company, Wilmington, Del.

[21] Appl. No.: 558,376

[22] Filed: Jul. 27, 1990

Related U.S. Application Data

[63] Continuation-in-part of Ser. No. 157,024, Feb. 18, 1989, abandoned.

[51] Int. Cl.$^5$ ............................................. C04B 35/00
[52] U.S. Cl. ...................... 505/1; 505/741; 505/780; 501/1; 264/63; 264/65
[58] Field of Search ............ 106/287.3, 287.2; 505/1, 741, 780; 501/1; 264/65, 63; 505/741, 780

[56] References Cited

U.S. PATENT DOCUMENTS

| | | | |
|---|---|---|---|
| 4,624,812 | 11/1986 | Farrow et al. | 264/63 |
| 4,810,463 | 3/1989 | Schwarz et al. | 419/10 |
| 4,904,424 | 2/1990 | Johnson | 501/153 X |

FOREIGN PATENT DOCUMENTS

| | | |
|---|---|---|
| 16307 | 10/1980 | European Pat. Off. . |
| 114746 | 8/1984 | European Pat. Off. . |
| 292125 | 11/1988 | European Pat. Off. . |

OTHER PUBLICATIONS

Lee et al., "Metal and Polymer Matrix Composites", pp. 10–18, and 121–123, Noyes Data Corp. (1989).
Sherwood (Ed.), "The Plastically Crystalline State", Chaps. 1 and 8, Wiley, 1979.
Gray et al., "Liquid Crystals and Plastic Crystals" pp. 48–59, Horwood/Wiley (1974).
Aston in Fox et al. (Eds), "Physics and Chemistry of The Organic Solid State", pp. 543–582 (1963).
Kirk-Othmer, "Encyclopedia of Chemical Technology", 3rd Ed., vol. 5, "Ceramics", pp. 251–252, 312 and 313 (1979).
Bednorz et al., Europhysics Letters, vol. 3, No. 3, pp. 379–385 (1987).
Chu et al., Science, vol. 235, pp. 567–569 (1987).
Cava et al., Physical Review Letters, vol. 58, No. 16, pp. 1676–1679 (1987).

Primary Examiner—Karl Group

[57] ABSTRACT

Ceramic compositions comprising a distillable binder, shaped articles formed therefrom and a method for making said compositions and for forming the shaped articles.

10 Claims, No Drawings

CERAMIC/DISTILLABLE BINDER COMPOSITIONS

CROSS-REFERENCE TO RELATED APPLICATION

This application is a continuation-in-part of application U.S. Ser. No. 07/157,024, filed Feb. 18, 1989 now abandoned.

BACKGROUND OF THE INVENTION

This invention relates to ceramic compositions containing a distillable binder, shaped articles formed therefrom and preparative processes for the shaped articles and for the compositions.

Shapeable ceramic or preceramic compositions containing polymeric binders wherein the polymer provides a matrix for the composition are well known. Examples of such polymeric binders are epoxy resins, phenolic resins, polyimides, polysulfones, polystyrenes, polyaramids, polyesters and polycarbonates; see, for example, Lee et al., "Metal and Polymer Matrix Composites", Noyes Data Corp., 1987, pages 10 to 18 and 121 to 123. Polymers provide plastic properties which impart toughness and shapeability to ceramic components. However, the polymers must be destructively burned off during densification/firing of the ceramic composite. Frequently, undesirable carbonization occurs during removal of the polymer binder by the technique of burning it off.

So far as can be determined, the art until this time has been unaware of a process for forming ceramic articles from a ceramic/binder composition without the necessity for destructive removal of the binder with the dangers attendant thereon of contaminating the ceramic with undesired polymer residues. It is the subject of this invention to provide compositions of ceramic particulates and methods for making and working the compositions so that it will now be possible to make ceramic articles without the necessity and cost of destroying the polymeric binder matrix used to hold the ceramic particles together until the sintering step.

SUMMARY OF THE INVENTION

This invention is based on the discovery that certain materials heretofore unknown to be useful for this purpose can be employed as distillable binders for ceramic particles. These materials can be nondestructively distilled or sublimed from the shaped composite without formation of carbon or other byproducts, and are available for reuse. Suitable distillable binders include crystalline organic compounds which form plastic crystalline mesophases known as "plastic crystals", said plastic crystalline phases usually having cubic symmetry and two transition temperatures (melting points) between which "plastic" properties are exhibited. When the plastic properties occur within a practical temperature range, such crystals can serve as matrices for ceramic materials.

This invention comprises a composition of particulates of one or more ceramic materials, precursors of one or more ceramic materials, or mixtures thereof, and at least 10% by weight of a distillable binder wherein said distillable binder:

(a) is a nonpolymeric organic compound, or a mixture of such compounds, having plastic crystalline properties and at least one melting point in a temperature range of about −40° C. to about 300° C.; and (b) can undergo distillation, sublimation or evaporation to be recovered chemically unchanged under ceramic composition densification conditions; said composition capable of being formed into a shaped article.

This invention further comprises said composition in the form of a shaped article.

This invention further comprises a process for the preparation and densification of a ceramic shaped article comprising:

(i) admixing particulates of one or more ceramic materials, precursors of one or more ceramic materials, or mixtures thereof, and at least 10 weight percent of a distillable binder wherein said distillable binder:

(a) is an organic compound or mixture of such compounds having plastic crystalline properties and at least one melting point in the temperature range of from about −40° C. to about 300° C.; and (b) can undergo distillation, sublimation, or evaporation to be recovered chemically unchanged under ceramic composition densification conditions;

(ii) forming said admixture into the desired shape; and (iii) removing said distillable binder by distillation, sublimation, or evaporation, and sintering the ceramic components.

This invention further comprises the above process wherein said distillable binder removed in step (iii) is recovered, and wherein said recovered distillable binder is reused in step (i).

DETAILED DESCRIPTION OF THE INVENTION

The term "ceramic" as employed in the description of this invention specifically includes superconducting oxides in the broadest sense. The term also includes high melting metals and ceramic precursors which are converted into ceramics at elevated temperature.

By "distillable binder" is meant one that can be removed from the composition by distillation, sublimation, evaporation, and the like, and recovered chemically unchanged under ceramic composition densification conditions. Distillable binders include, but are not limited to, organic nonpolymeric compounds having plastic crystalline properties (plastic crystals).

Plastic crystals differ from solid crystals in that they show unusually low yield points. The most plastic will flow under their own weight, although the majority are less soft. The pressure required to produce flow is very considerably less than that required to extrude an ordered solid crystal produced by transition from the plastic crystal at a lower temperature.

Plastic crystals are thus neither true liquids wholly devoid of long-range molecular order nor true crystalline solids with molecules in regular long-range orientational and positional order, but constitute a further mesomorphic state of matter.

The mesophases are typically constituted by rather compact globular molecules which are not markedly anisodimensional and which, when undergoing rotatory displacements about certain axes, acquire, effectively, close-to-spherical symmetry. These globular molecules in the stationary state may, however, depart quite appreciably from spherical symmetry. Thus, tetramethylmethane and the carbon tetrahalides (near-to-spherical), hexamethylethane (prolate spheroid), cyclohexane (oblate spheroid) and 2,2-dimethylbutane (pear-shaped) are among the very numerous compounds which form cubic mesophases or as these are more commonly termed, plastic crystals.

It was early recognized that the formation of plastic crystals is due to the capacity of the constituent molecules over a particular range of temperatures to arrange themselves in a cubic array while at the same time undergoing thermal rotatory displacements so that there is no long-range orientational order between the molecules. The term "plastic" is used herein to denote this state. At the upper limit of this temperature range liquefaction occurs with breakdown of the cubic arrangement but with only a small increase in entropy and little increase in volume. At the lower temperature limit a transition occurs (Crystal I→Crystal II), typically to an ordered anisotropic solid crystal. In this case there is a large decrease in entropy. Occasionally, however, there is a transition with only a small entropy decrease to a second (and sometimes even to a third) plastic crystalline form which undergoes a transition at a still lower temperature with a larger decrease in entropy to an ordinary solid crystal. The successive plastic crystalline phases presumably differ in the details of the permissible thermal displacements of the molecules and thus provide an analogy in the plastic mesophases to the polymorphism encountered in the smectic series.

It is now known that the molecular motion in plastic crystals is rarely, if ever, free molecular rotation in the literal sense. Such motion is not generally found even in amorphous liquids. Rather, the barriers between positions of minimum potential energy are small enough to allow the molecules to tumble rapidly from one orientation to another, the orientations at distances of more than a few molecular diameters being randomly distributed throughout the phase.

It was their peculiar thermal behavior which led to the recognition of plastic crystals as a unique intermediate state of matter. In addition to a very low entropy of liquefaction, plastic crystals usually also show a relatively high temperature of liquefaction. Thus, with globular molecules which form plastic crystals the normal amorphous liquid phase as formed by the majority of non-globular and non-lath-like molecules is replaced, over a particular range of temperatures, by the cubic plastic mesophase. The transition, crystalline solid→mesophase, is accompanied by a high entropy increase, while the entropy increase for the transition mesophase→amorphous liquid is relatively small. This points to a degree of molecular disorder in the mesophase closer to that in the amorphous liquid than to that in the solid crystal. A value for the number of permissible molecular orientations that can be adopted at random in the plastic crystals may be estimated in some instances from measurements of heat capacities and entropies of phase change.

Such plastic crystals and their properties are described in Sherwood (Ed.), "The Plastically Crystalline State", Wiley, 1979, especially Chaps. 1 and 8; Gray et al., (Eds.), "Liquid Crystals and Plastic Crystals", Horwood/Wiley, 1974, pages 48 to 59; Aston in Fox et al. (Eds.), "Physics and Chemistry of the Organic Solid State", Interscience, 1963, pages 543 to 583. There is no suggestion in this art or any other so far as can be determined that plastic crystals can be employed as binders or matrices for ceramic compositions. The above listed references are herein incorporated by reference.

Distillable binder compounds having plastic crystalline properties suitable for use in the present invention include, for example, selected alkanes and substituted alkanes, which may be acyclic or cyclic containing not more than about 10 carbon atoms, such as succinonitrile, t-butanol, cyclohexanol, trioxane, d-1-camphor and adamantane. For use in the present invention, the distillable binder compounds must have at least one melting point in a temperature range of about $-40°$ C. to about $300°$ C.

The most preferred binder of this invention is succinonitrile. Another preferred binder is 1,3,5-trioxane (trioxane).

The ceramic component of the compositions of this invention may be broadly selected from oxides, nitrides, carbides or silicides, or from metals such as iron. Preferred are aluminum oxide, aluminum nitride, or a mixture of aluminum nitride and boron nitride. Representative of the ceramics that can be employed to make the compositions of this invention are those discused in Kirk-Othmer, "Encyclopedia of Chemical Technology", 3rd Edition, Vol. 5, "Ceramics", pages 234 to 314, 1979, herein incorporated by reference. See, especially, the Tables on pages 251, 252, 312 and 313.

Especially preferred ceramic materials for use in preparing the ceramic/distillable binder compositions of the present invention are mixed metal oxide phases which are superconducting. The development of superconducting oxide materials is described by Clarke in Advanced Ceramic Materials, 2(3B), 273 (1987). Examples of superconducting oxides that can be employed to make the compositions of this invention include $La_{1-x}(Ba, Sr, Ca)_xCuO_{4-y}$ wherein x is typically about 0.15 and y indicates oxygen vacancies (Bednorz et al. Europhys. Lett. 3, 379 to 384, (1987), or the so-called "1-2-3" superconducting phases having the formula $MBa_2Cu_3O_x$ wherein M is selected from Y, Nd, Sm, Eu, Gd, Dy, Ho, Er, Tm, Yb, La AND Lu, and x is from about 6.5 to 7.0 (Chu et al. Science 235, 567 (1987). See also Cava et al. Phys. Rev. Lett. 58, 1676 (1987). The above references are herein incorporated by reference.

Also useful are powdered precursors of superconducting oxides. A suitable precursor can be prepared by mixing barium oxide and yttrium oxide with an aqueous solution of cupric nitrate or acetate at a temperature of about $50°$ C. to $100°$ C. to obtain a suspension of yttrium:barium:copper in an atomic ratio of about 1:2:3, and drying the suspension to obtain the powdered precursor. Also useful are superconductors having the formula $Bi_2Sr_{3-z}Ca_zCu_2O_{8+w}$ wherein z is about 0.1 to 0.9, preferably 0.4 to 0.8, and w is greater than 0 but less than about 1. Pure phase superconductive ceramics as well as ceramics containing no superconductive phase or mixed ceramic/superconductive phases, of any crystal structure and morphology, can be employed in the compositions and processes of this invention.

Following are several typical embodiments of the compositions of this invention.

A. A composition comprising one or more ceramic particulates and/or particulate precursors thereof, and at least about 10 weight percent, preferably at least about 20 weight percent, of a distillable binder comprising one or more organic compounds having plastic crystalline properties in a temperature range of about $-40°$ C. to $300°$ C., preferably about $15°$ C. to $200°$ C.

B. A composition as in Embodiment A wherein the organic crystalline compound is succinonitrile or trioxane.

C. A composition as in Embodiment B wherein the ceramic compound comprises a superconducting phase such as a "1-2-3" type.

D. A composition as in Embodiment B wherein the ceramic compound comprises one or both of aluminum oxide or nitride.

E. A composition of any one or more of Embodiments A to D in the form of a shaped article.

F. A composition as in Embodiment E wherein the article is in the shape of a film or fiber.

This invention further comprises a process for the preparation and densification of a ceramic shaped article.

The following represent several typical embodiments of methods for forming the compositions of this invention.

G. A process for preparing a composition as in Embodiments A through D comprising admixing a distillable binder comprising an organic compound or mixture of such compounds having plastic crystalline properties, and one or more ceramic materials, optionally in the presence of a solvent for the binder.

H. A process as described in Embodiment G conducted at a temperature within, or above, the plastic range of said binder followed by removing any solvent that may be present.

I. A process for densifying a composition as described in any of Embodiments A through F comprising distilling, subliming or evaporating the binder from the composition and sintering the ceramic component, the process being characterized in that the distillation, sublimation or evaporation step does not destroy the binder or leave binder residue in the component during densification.

J. A process as in Embodiment I comprising the additional step of recovering the binder, chemically unchanged.

The ceramic materials should be in particulate form, preferably fine powder containing largely submicron particles. The distillable binder for use in the invention preferably is any organic compound, or mixture of such compounds, which has at least one melting point and exhibits plastic properties in a given temperature range. Many but not all of the distillable binders contemplated for use in this invention have dual melting points with the plastic range usually occurring between the two melting points. Trioxane, however, is one instance of a preferred distillable binder that has but a single melting point.

It is convenient, but not essential, to dissolve the binder in a comparatively volatile solvent which is chemically inert in the mixing and solvent removal steps. When the binder is succinonitrile or trioxane, then methylene chloride, or more preferably, mixtures of methylene chloride and methanol, are suitable solvents. It is desirable that the solvent be capable of wetting the ceramic component. It may also be desirable to add other materials, such as acetic acid, which aid dispersion of the particulate ceramic material and/or prevent caking or agglomeration of the particulate ceramic.

Uniform mixing in the presence of solvent can be conveniently accomplished on a small scale in a Waring or food blender, although other mixing methods can be employed which will be known to those of ordinary skill in the ceramic art. After mixing, solvent(s) should be removed by evaporation under gentle heat. Alternatively, the components can be blended without added solvent at a temperature at which the binder is in liquid form. The binder can be supported on an inert support such as an oxide, and dry-mixed in particulate form with the ceramic particulate. The blend, after removal of solvent, if any, is then molded into a shape, for example a film, or extruded into a fiber, said shaping being performed at a temperature within, or above, the plastic range of the binder. Most conveniently, the compositions, after shaping but before densification, are handled at temperatures within the plastic range of the binder.

The most preferred binder of this invention, succinonitrile, has melting points at −40° C. and at +54° C. In the intervening temperature range, succinonitrile looks and acts like a soft plastic, undergoing plastic deformation under pressure to give clear flexible films. A blend containing 80 weight percent of alumina and 20 weight percent of succinonitrile can be processed into shaped articles at temperatures from somewhat below room temperature to, say, 100° C. or higher. The preferred binder, trioxane, melts at 64° C. but has plastic properties at room temperature. A composition containing about 20 weight percent or more of trioxane can be shaped at temperatures from room temperature to 100° C. or higher.

The compositions and processes of this invention are useful to make ceramic-containing laminates. For instance, an electronically useful substrate such as alumina, zirconia or magnesia can be coated with a composition of this invention. Upon firing, the ceramic will adhere to the substrate to form a two-layer laminate desirably free of contaminant residue. Multilayer laminates can be formed by stacking ceramic particulate/binder films of the same or different composition, or by applying ceramic particulate/binder films to laminates before firing. Structures of widely varying configuration can be made consistent only with the need to provide exit capability for the distillable binder. Such laminates comprising one or more superconducting layers can be employed as bases for connecting electronic components with the objective of reducing electrical losses in the interconnections when said layers are placed in the superconducting state by cooling below the superconducting transition temperature.

In the following illustrative Examples, parts and percentages are by weight and temperatures are in degrees Celsius unless otherwise specified.

EXAMPLE 1

Methylene chloride (150 mL), succinonitrile (20 g), Alcoa A-16 alumina powder (80 g), methanol (20 mL) and acetic acid (0.4 mL) were mixed in a food blendor. Solvent was removed by evaporation while slowly mixing, giving a gray plastic residue. A plug (2.9 cm diameter ×0.92 cm length) and thin sheet were pressed at room temperature and slowly heated to 1500° during which time the succinonitrile was distilled. The thin sheet provided a hard, strong, crack-free ceramic that gave a strong metallic ring when tapped. The larger plug held together but contained some cracks which were believed due to too rapid distillation of the succinonitrile from thick sections.

EXAMPLE 2

Alcoa A-16 alumina (160 g), succinonitrile (40 g) and acetic acid (1 mL) were blended on an ink mill at 120°. The blend was easily molded at 100° and 300 psi (2700 kPa), giving very flexible molded pieces.

EXAMPLE 3

Substitution of trioxane for the succinonitrile employed in Example 1 would provide similar shaped articles when worked up according to the procedure described in that Example.

EXAMPLE 4

Substitution of trioxane for the succinonitrile employed in Example 2 would provide a composition of similar moldability when worked up according to the procedure described in that Example.

EXAMPLE 5

Iron powder containing 2 percent nickel (180 g) and succinonitrile (20 g) were blended on a rubber mill at 300°. Part of the succinonitrile was thought to have evaporated. The blend was pressed at room temperature to a flexible film.

EXAMPLE 6

Three g of $YBa_2Cu_3O_7$ superconducting oxide particulate and 1 g of succinonitrile were placed in a glass vial. The mixture was stirred with a spatula while being warmed in a stream of hot air. The resulting dispersion was quickly poured on a piece of aluminum foil to form a thick pliable film. Half of this film was sandwiched between sheets of aluminum foil and pressed in a Carver laboratory press at room temperature with a load of about 12000 pounds. The resulting black pliable film was about 25 to 40 mils thick.

Strips cut from this film were laid on a thin piece of $ZrO_2$ electronic substrate and on a piece of single crystal MgO. The combinations were placed in a horizontal position in an oven with an air atmosphere. The temperature was raised from room temperature to 160° at 1 degree per minute, held at 160° for 180 minutes, raised from 160° to 910° at 2 degrees per minute, held at 910° for 1 minute, raised from 910° to 915° at 2 degrees per minute, and held at 915° for 60 minutes. The oven was then allowed to cool to 650° at 5 degrees per minute, held at 650° for 60 minutes, then cooled from 650° to 50° at 2 degrees per minute. The resulting black adherent coatings were tested for conductivity by a four probe technique. The film laminates both showed transitions to superconductivity at temperatures above that of liquid nitrogen.

EXAMPLE 7

The composition of Example 6 can be made employing succinonitrile supported on zirconium oxide. Powdered supported binder and superconducting oxide are milled together in a rubber mill at about 100° and the composite pressed into a film as described in that Example.

EXAMPLE 8

Compositions similar to those described in Examples 6 and 7 can be made from powdered precursors of the superconducting oxide employed in those Examples. A suitable powdered precursor can be prepared, for example, as follows: aqueous solutions of yttrium acetate and cupric acetate at about 75° are mixed together, and then barium hydroxide $(Ba(OH)_2.8H_2O)$ is added slowly thereto, with stirring, the amounts being such that yttrium, barium and copper are present in an atomic ratio of about 1:2:3, respectively. The resulting suspension is stirred at 75° until a paste is obtained. The paste is heated until dry, then further dried in a vacuum oven at about 170° for 1 hour, and ground to a fine powder. Likewise, trioxane can be employed in place of, or in admixture with, the succinonitrile of Examples 5, 6 and 7.

What is claimed is:

1. A composition comprising particulates of one or more ceramic materials, precursors of one or more ceramic materials, or mixtures thereof, and at least 10% by weight of a distillable binder wherein said distillable binder.
    (a) is succinonitrile or trioxane, having plastic crystalline properties and at least one melting point in a temperature range of about −40° C. to about 300° C.; and
    (b) undergoes distillation, sublimation or evaporation under ceramic composition densification conditions and is recovered chemically unchanged under ceramic composition densification conditions; said composition capable of being formed into a shaped article.

2. A composition according to claim 1 wherein the binder is succinonitrile.

3. A composition according to claim 1 wherein the binder is trioxane.

4. A composition according to claim 1 wherein the ceramic comprises one or both of aluminum oxide and aluminum nitride.

5. A composition according to claim 1 wherein the ceramic comprises a superconductor.

6. A composition according to claim 5 wherein the superconductor comprises $YBa_2Cu_3O_7$.

7. A composition according to claim 5 wherein the superconductor comprises at least one compound of yttrium, barium and copper in the atomic weight ratio of about 1:2:3, respectively.

8. A composition according to claim 1 in the form of a shaped article.

9. A composition according to claim 8 wherein the article is in the shape of a film.

10. A composition according to claim 8 in the form of a laminate structure.

* * * * *